(12) United States Patent
Lee et al.

(10) Patent No.: US 10,454,584 B1
(45) Date of Patent: Oct. 22, 2019

(54) OPTICAL LINE TERMINAL AND METHOD FOR MANAGING PASSIVE OPTICAL NETWORK IMPLEMENTED THEREON

(71) Applicant: DASAN Zhone Solutions, Inc., Oakland, CA (US)

(72) Inventors: Seung Dong Lee, Fremont, CA (US); Kyoung Soo Kim, Seongnam-si (KR)

(73) Assignee: DASAN Zhone Solutions, Inc., Oakland, CA (US)

( * ) Notice: Subject to any disclaimer, the term of this patent is extended or adjusted under 35 U.S.C. 154(b) by 0 days.

(21) Appl. No.: 16/174,220

(22) Filed: Oct. 29, 2018

(51) Int. Cl.
*H04B 10/00* (2013.01)
*H04B 10/27* (2013.01)
*H04B 10/67* (2013.01)

(52) U.S. Cl.
CPC ........... *H04B 10/27* (2013.01); *H04B 10/672* (2013.01)

(58) Field of Classification Search
USPC ...................................................... 398/66–73
See application file for complete search history.

(56) References Cited

U.S. PATENT DOCUMENTS

| | | | | |
|---|---|---|---|---|
| 7,127,178 B2 * | 10/2006 | Mahlab | ............... | H04B 10/2507 398/141 |
| 7,289,731 B2 * | 10/2007 | Thinguldstad | ...... | H04L 12/2861 398/66 |
| 7,751,707 B2 * | 7/2010 | Zaacks | ................ | H04J 14/0227 398/158 |
| 8,145,057 B2 * | 3/2012 | Costa | ................... | H04L 12/2898 398/151 |
| 8,755,689 B2 * | 6/2014 | Valvo | ..................... | H04B 10/07 370/352 |
| 9,742,496 B2 * | 8/2017 | Coffey | .................... | H04B 10/40 |
| 9,780,909 B2 * | 10/2017 | Wood | .................. | H04J 14/0286 |
| 9,998,215 B2 * | 6/2018 | Skirmont | ........... | H04B 10/0773 |
| 2009/0010642 A1 * | 1/2009 | Sui | ..................... | H04B 10/0793 398/9 |
| 2009/0097861 A1 * | 4/2009 | Ikeda | ..................... | H04J 3/1694 398/167.5 |
| 2009/0162063 A1 * | 6/2009 | Mizutani | ............... | H04J 3/0682 398/58 |
| 2009/0162065 A1 * | 6/2009 | Mizutani | ............... | H04J 3/0655 398/66 |
| 2009/0263132 A1 * | 10/2009 | Rafel | .................... | H04J 3/0682 398/66 |
| 2010/0003030 A1 * | 1/2010 | Gilfedder | ............ | H04L 41/0856 398/67 |
| 2010/0290783 A1 * | 11/2010 | Kazawa | ............. | H04Q 11/0067 398/66 |
| 2011/0170871 A1 * | 7/2011 | Kazawa | ................ | H04J 3/0682 398/66 |
| 2011/0262139 A1 * | 10/2011 | Costa | .................. | H04L 12/2898 398/66 |
| 2011/0302283 A1 * | 12/2011 | Nors | ................... | H04L 12/2861 709/222 |

(Continued)

*Primary Examiner* — Agustin Bello

(57) ABSTRACT

Disclosed is network management technology for an optical line terminal. The optical line terminal allocates a line identifier according to a line length from each port to an end thereof. Terminal connection information is managed such that a corresponding line identifier is mapped to a measured line length to an optical network terminal. Service settings for an optical network terminal are managed by the line identifier.

20 Claims, 4 Drawing Sheets

(56) References Cited

U.S. PATENT DOCUMENTS

| | | | | |
|---|---|---|---|---|
| 2012/0263458 A1* | 10/2012 | Wen | H04B 10/071 | 398/28 |
| 2013/0230326 A1* | 9/2013 | Hu | H04Q 11/0067 | 398/67 |
| 2014/0006956 A1* | 1/2014 | Huliyar | H04B 10/07 | 715/736 |
| 2014/0177657 A1* | 6/2014 | Bowcutt | H04B 10/077 | 370/535 |
| 2014/0193147 A1* | 7/2014 | Smith | H04B 10/071 | 398/16 |
| 2014/0308032 A1* | 10/2014 | Skirmont | H04B 10/0773 | 398/25 |
| 2014/0308033 A1* | 10/2014 | Park | H04B 10/071 | 398/25 |
| 2015/0288446 A1* | 10/2015 | Yin | G02B 6/3895 | 398/28 |
| 2016/0087849 A1* | 3/2016 | Balasubramanian | H04L 41/12 | 709/221 |
| 2016/0173194 A1* | 6/2016 | Zhou | H04B 10/071 | 398/21 |
| 2016/0191194 A1* | 6/2016 | Wood | H04J 14/0286 | 398/58 |
| 2016/0308606 A1* | 10/2016 | Skirmont | H04B 10/0773 | |
| 2016/0352429 A1* | 12/2016 | Coffey | H04B 10/40 | |
| 2017/0317780 A1* | 11/2017 | Wood | H04J 14/0286 | |
| 2017/0346569 A1* | 11/2017 | Coffey | H04B 10/40 | |

* cited by examiner

OPTICAL LINE TERMINAL AND METHOD FOR MANAGING PASSIVE OPTICAL NETWORK IMPLEMENTED THEREON

BACKGROUND

1. Field

The present invention relates to a network management function of optical communication technology, in particular, an optical line terminal (OLT).

2. Discussion of Related Art

Generally, optical network terminals (ONT) in a passive optical network are identified by serial numbers assigned by their manufacturers. An optical line terminal (OLT) performs management by assigning a logical identifier (ONT-ID) to a serial number of an ONT. Service settings of an optical network are defined by such an ONT ID. In order to maintain a service even though an ONT is replaced, an OLT should discover an ONT with a new serial number and update management information such that the new serial number is mapped to an existing ONT-ID.

SUMMARY

The proposed invention is directed to providing a new identification technology of an optical network terminal.

Further, the proposed invention is directed to providing a new identification technology capable of providing a service without separate settings changes even when an optical network terminal is replaced.

According to an aspect, a line identifier is allocated according to line lengths from each port of an optical line terminal to line ends to which optical network terminals are connected.

According to another aspect, terminal connection information may be managed by matching identification information of the optical network terminals to line identifiers on the basis of network configuration information, which is information for mapping line lengths to the line identifiers, and terminal information, which is information of the optical network terminals. Since service settings are made for the optical network terminals on the basis of the line identifiers, a service may be maintained without a separate change in the settings although the optical network terminal is replaced.

According to still another aspect, the line lengths may be calculated from propagation distances measured between each of the ports of the optical line terminal and optical network terminals.

According to still another aspect, the line length information may be determined by reflecting, in the measured propagation distances, distance deviations determined according to the optical network terminals.

According to still another aspect, in addition to the line length, a different line identifier may be allocated depending on Rx optical power received from a corresponding optical network terminal.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above or other aspects will be implemented through embodiments described with reference to the accompanying drawings. It is to be understood that the components of each embodiment may be variously combined therein unless otherwise stated or mutually contradictory. That is, although each drawing is shown as one embodiment, it should not be understood as being limited to one embodiment. As will be described in separate optional or additional aspects, it is to be understood that one or more unessential blocks are combined as essential blocks to represent a variety of embodiments.

The components shown as the blocks in this specification, each of which is a set of instructions for performing a specific function in a computer program and is composed of a single or a plurality of program modules, may be sequential to or spaced apart from one another in the entire program.

Figure 1:
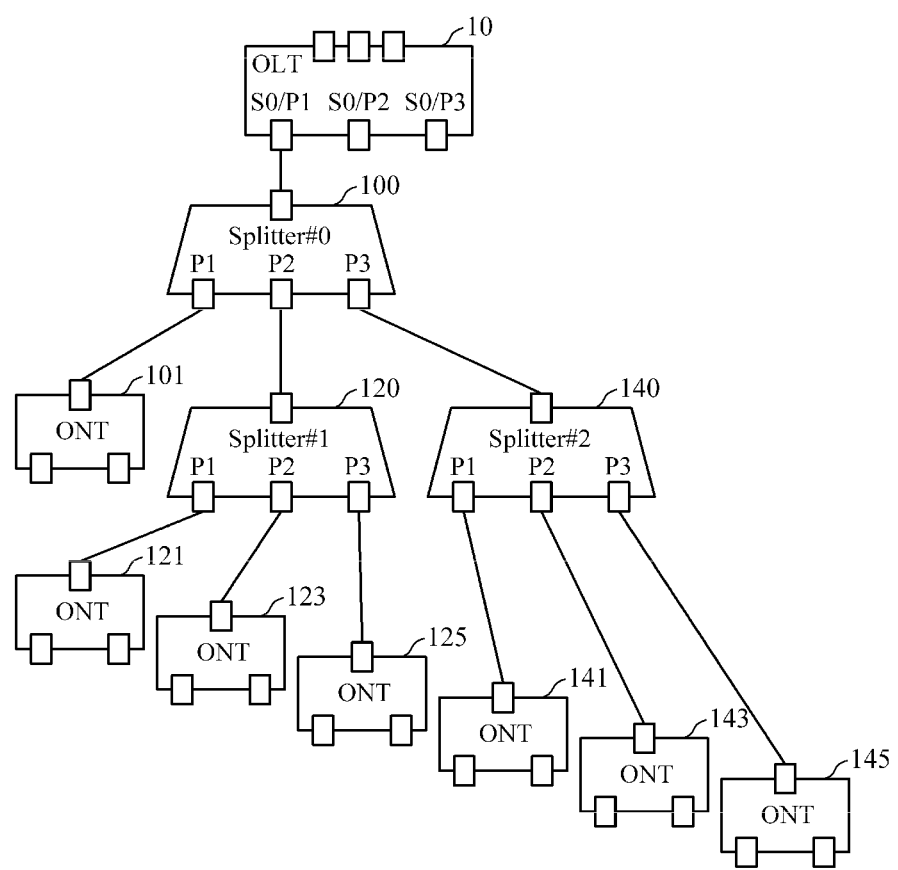
FIG. 1 shows an example passive optical network system to which an optical line terminal is applied according to an embodiment.

FIG. 1 shows an example passive optical network system to which an optical line terminal (OLT) is applied according to an embodiment. An OLT 10 has a plurality of ports, and a plurality of optical network terminals (ONTs) are connected to each of the ports through an optical distribution network. The optical communication distribution networks connected to the ports of the OLT may be identified by the ports. According to an aspect, ONTs connected to one port are identified by the line length of a line applied through an optical distribution network. An identifier of one ONT connected to each port is mapped to a line identifier corresponding to a line length reaching up to the ONT.

A line length from one port of an OLT to an ONT is assigned differently depending on the ONT. It is known that a distance measurement by a standard protocol between an OLT and an ONT has an error of about ±10 m. The line length according to the proposed invention may be designed for each ONT to have a length margin which is sufficient to exceed the error, for example, 100 m.

An ONT physically farther from an ONT may have a greater line length, but the order of distance between the OLT and the ONT does not need to be reflected in assigning a line length. Since the price of optical fiber line is getting lower and is already quite low, the remaining portion after a line is constructed for each apparatus port in order to encode by a line length may be wrapped and tied in front of or inside the port. When the physical distance order is reflected in the line length, an actual physical distance may be discovered from a line identifier, and the location of a corresponding ONT may be discovered.

In an example optical network of FIG. 1, an optical splitter 100 is connected to a port S0/P1 of the OLT. An example OLT has a plurality of slots each having a plurality of ports. Here, S0/P1 denotes port 1 of slot 0. An ONT 101 is connected to a port P1 of the optical splitter 100, and a plurality of ONTs 121, 123, 125, 141, 143, and 145 are connected to ports P2 and P3 through optical splitters 120 and 140.

According to an aspect, line lengths between the port S0/P1 of the OLT 100 and the ONTs 101, 121, 123, 125, 141, 143, and 145 connected to the port S0/P1 through an optical distribution network are designed to be different from one another. For example, the line length to each ONT may be designed for each section, as follows:

|  | Line Length between OLT Port and Optical Splitter #0 | Line Length between Optical Splitters | Line Length between Optical Splitter and ONT | Total Line Length to ONT |
|---|---|---|---|---|
| ONT#1 | 100 | — | 300 | 400 |
| ONT#2 | 100 | 400 | 300 | 800 |
| ONT#3 | 100 | 400 | 400 | 900 |
| ONT#4 | 100 | 400 | 500 | 1000 |
| ONT#5 | 100 | 500 | 500 | 1100 |
| ONT#6 | 100 | 500 | 600 | 1200 |
| ONT#7 | 100 | 500 | 700 | 1300 |

In this design, in order to set the ONTs to have different total line lengths, line lengths from ports of an optical splitter #1 120 and an optical splitter #2 140 to corresponding ONTs connected to the ports should be determined in consideration of top stage line lengths.

Figure 2:
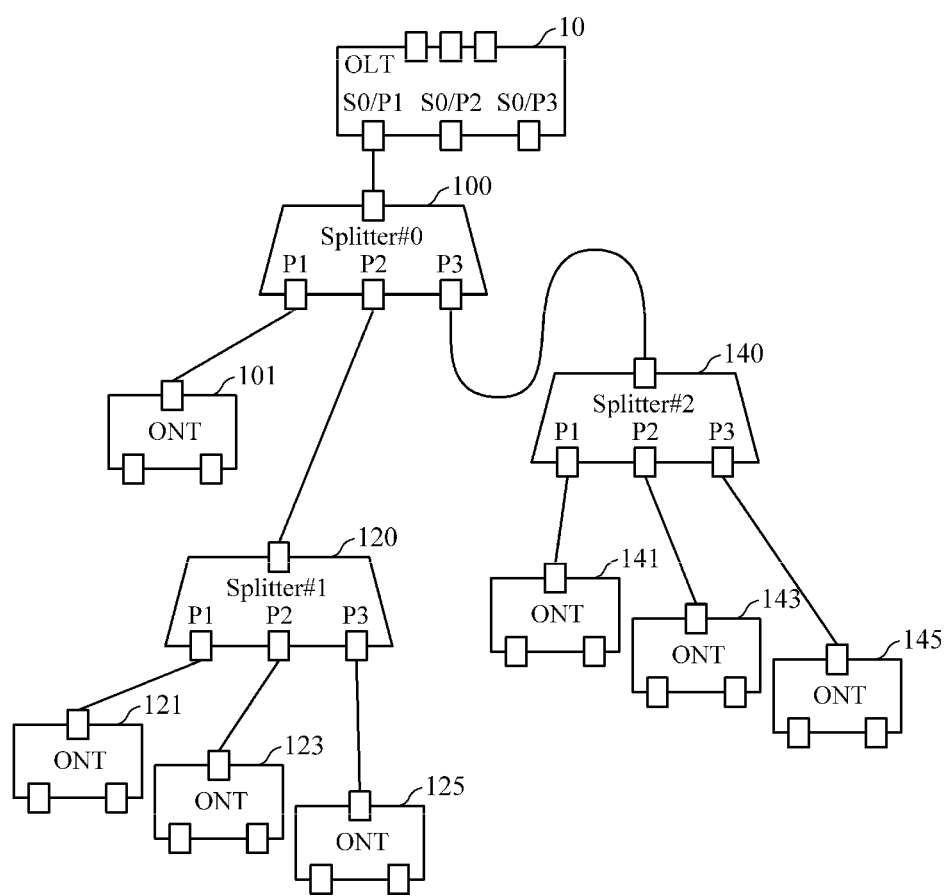
FIG. 2 shows an example passive optical network system to which an optical line terminal is applied according to another embodiment.

FIG. 2 shows an example passive optical network system to which an OLT is applied according to another embodiment. In this embodiment, the line length to each ONT may be designed for each section, as follows:

|  | Line Length between OLT Port and Optical Splitter #0 | Line Length between Optical Splitters | Line Length between Optical Splitter and ONT | Total Line Length to ONT |
|---|---|---|---|---|
| ONT#1 | 100 | — | 300 | 400 |
| ONT#2 | 100 | 600 | 100 | 800 |
| ONT#3 | 100 | 600 | 200 | 900 |
| ONT#4 | 100 | 600 | 300 | 1000 |
| ONT#5 | 100 | 900 | 100 | 1100 |
| ONT#6 | 100 | 900 | 200 | 1200 |
| ONT#7 | 100 | 900 | 300 | 1300 |

A passive optical network according to this embodiment has the same total line length to an ONT as that of the embodiment of FIG. 1. However, the ports of each of the splitters at lower stages have line lengths of 100, 200, and 300. This is because the ports of each of the splitters at upper stages have line lengths of sufficiently spaced values, that is, 300, 600, and 900. In this case, the ports of the splitter may be identified by using the line lengths.

In the embodiment shown in FIG. 2, when splitters are connected in a cascade through multiple stages, the line lengths of the ports of each of the splitters at the bottom stage are equally distributed to one another of the splitters, and the optical splitters at a directly upper stage are determined to be sufficiently spaced from one another in consideration of the distribution of the line lengths of the optical splitter at the bottom stage. In this case, the line lengths are uniform for each stage, and thus it is advantageous in terms of construction and design. The line lengths of the lines connected to the ports of the optical splitter at the upper stage should be sufficiently different from one another in consideration of the number of ONTs connectable to the optical splitter.

According to an aspect, the difference between the line lengths of the optical splitter may be made invisible from the outside by winding optical fiber lines inside the optical splitter, which is a passive optical element, according to the line lengths. In this case, a construction worker may construct the optical fiber lines of the same length in the optical splitter.

Figure 3:
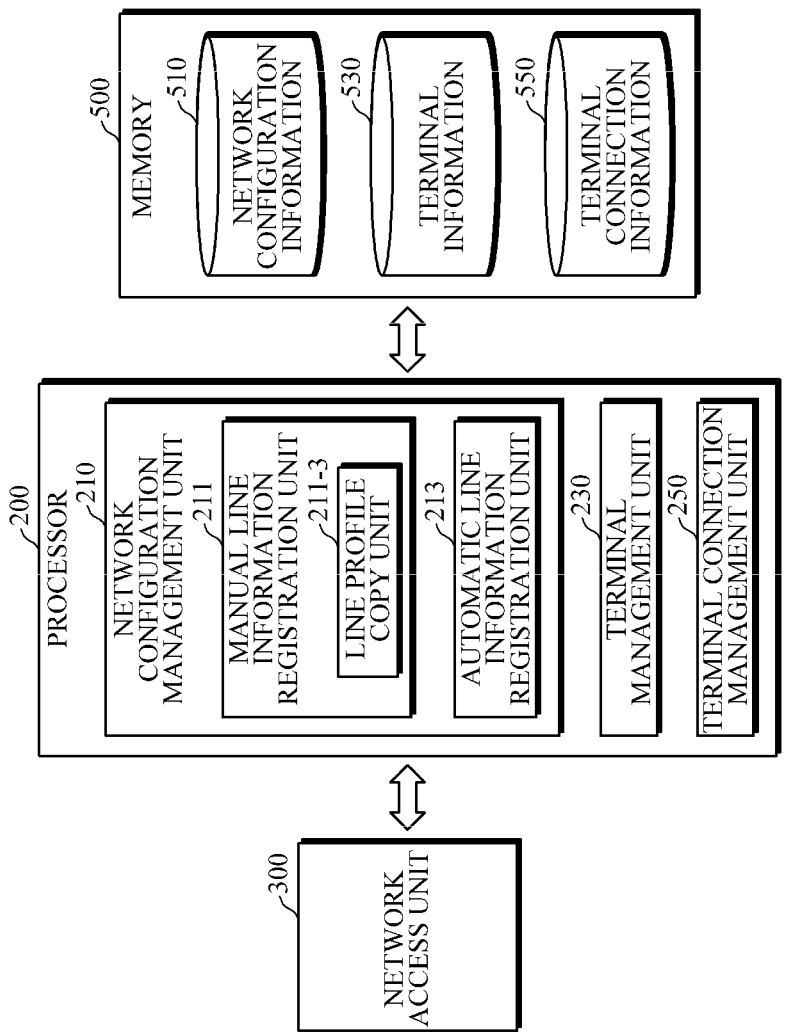
FIG. 3 is a block diagram showing a configuration of an optical line terminal according to an embodiment.

FIG. 3 is a block diagram showing a configuration of an OLT according to an embodiment. As shown, the OLT includes a network access unit 300, a processor 200, and a memory 500. The network access unit 300 includes a photoelectric conversion unit and a modulation/demodulation circuit, and an optical fiber line is connected to the network access unit 300. The processor 200, which is a computing element that executes a management program, may include a microprocessor and a dedicated circuit such as a logical device or a gate array. The processor 200 processes a packet received through one port of the network access unit 300 and transmits the processed packet to another port. The memory 500 stores data and a program to be executed by the processor 200. The program stored in the memory 500 includes an operating system and a management program. The data stored in the memory 500 includes management data needed by the processor 200 to execute the management program.

In an embodiment, the management data includes network configuration information 510. The network configuration information 510 includes line length information regarding line lengths from ports of the OLT to corresponding ends and line identifier information corresponding to the line length information. According to the present invention, a line identifier is used to identify a line from a port of the OLT of FIG. 2 to an end of the line to which one ONT is connected. Unlike the conventional technology in which an ONT identifier for identifying an ONT is employed, according to the present invention, the network configuration information 510 of the passive optical network is managed by line identifiers. For example, for the optical network shown in FIG. 2, the network configuration information managed by the OLT may have a table form as follows:

| Line Length | Line Identifier |
|---|---|
| 400 m | L1 |
| 800 m | L2 |
| 900 m | L3 |
| 1,000 m | L4 |
| 1,100 m | L5 |
| 1,200 m | L6 |
| 1,300 m | L7 |

According to an aspect, the management program may further include a network configuration management unit 210. The network configuration management unit 210 maps a piece of the line length information corresponding to an end for each port to a line identifier and registers the mapped line length information in the network configuration information 510.

According to a specific aspect, the network configuration management unit 210 may include a manual line information registration unit 211. The manual line information registration unit 211 receives the line length information regarding the line lengths from a manager to the ends for the ports, maps the line length information to line identifiers, and stores the mapped line length information in the network configuration information 510. To this end, the processor provides a form needed to register line information in the form of a graphics screen interface through a manager terminal, receives line information including line length information, assigns unique line identifiers to the line information, and registers the line information in the network configuration information. The line length information is information regarding a length from any one port of an OLT to a line end to which one ONT for the port is connectable. The line length information corresponds to a design value of the optical network.

According to another aspect, the manual line information registration unit 211 may include a line profile copy unit 211-3. The line profile copy unit 211-3 copies network configuration information of a first port to network configuration information of a second port. When an optical distribution network connected to the first port of the OLT is moved to the second port as a whole, or when the optical distribution network of the second port is designed to have the same line length distribution as the optical distribution network of the first port, the network configuration information of the second port may be generated by copying the network configuration information of the first port. A manager may simply process such a task by selecting the second port and then using a network configuration information copy menu.

According to another specific aspect, the network configuration management unit 210 may include an automatic line information registration unit 213. For example, after a corporate network is constructed, the automatic line information registration unit 213 measures a propagation distance from each port to a corresponding ONT, calculates line length information regarding line lengths to line ends to which ONTs are to be connected, and stores the line length information in the network configuration information while the line length information is mapped to a corresponding line identifier. The automatic line information registration unit 213 searches for ONTs corresponding to all the ports through the network access unit 300. When an ONT is discovered, the automatic line information registration unit 213 measures a propagation distance to the ONT and calculates line length information on the basis of the measured propagation distance. The propagation distance may be measured through a known standard protocol.

According to an additional aspect, the network configuration information 510 may further include line identifier specific location information. The location of a corresponding ONT may be estimated from a line-identifier-specific line length, but detailed location information, for example, information indicating coordinates and locations, may be included in the network configuration information 510 as attribute values of the corresponding ONT.

According to an aspect, the management data further includes terminal connection information 550. The terminal connection information 550 includes a line identifier and mapping information of an identifier of an ONT connected to a corresponding line. For example, for the passive optical network of FIG. 1, the terminal connection information 550 may be in the following table form:

| Line Identifier | Serial Number of Terminal | Identification Information of Terminal |
|---|---|---|
| L1 | ZNTS036395e2 | N1 |
| L2 | ZNTS036396da | N2 |
| L3 | ZNTS03638f3e | N3 |
| L4 | ZNTS03639570 | N4 |
| L5 | ZNTS036388a0 | N5 |

-continued

| Line Identifier | Serial Number of Terminal | Identification Information of Terminal |
|---|---|---|
| L6 | ZNTS036395f0 | N6 |
| L7 | ZNTS036393f8 | N7 |

In an embodiment, the management program includes the terminal connection management unit 250. According to an aspect, the terminal connection management unit 250 manages the terminal connection information 550 such that the identifier of one ONT connected to each port is mapped to a line identifier corresponding to a line length to the ONT. Based on the terminal connection information, service information is set for ONTs. The service information may be, for example, traffic profile, VLAN information, multicast group information, or the like.

According to another aspect, the management data may further include terminal information 530. In this case, the management program may further include a terminal management unit 230. When an activation event has occurred in an ONT, the terminal management unit 230 checks the identification information of the ONT and a line length mapped to the identification information. When there is a change in the line length, the terminal management unit 230 updates the terminal information. For example, for the passive optical network of FIG. 1, the terminal information 530 may be in the following table form:

| Port of OLT | Identification information of ONT | Status | Serial Number of ONT | Line length |
|---|---|---|---|---|
| 0/1 | N1 | Active | ZNTS036395e2 | 400 m |
| 0/1 | N2 | Active | ZNTS036396da | 800 m |
| 0/1 | N3 | Active | ZNTS03638f3e | 900 m |
| 0/1 | N4 | Active | ZNT503639570 | 1,000 m |
| 0/1 | N5 | Active | ZNTS036388a0 | 1,100 m |
| 0/1 | N6 | Active | ZNTS036395f0 | 1,200 m |
| 0/1 | N7 | Active | ZNTS036393f8 | 1,300 m |

The terminal management unit 230 monitors an activation event of an ONT at each port. For example, when a specific ONT is newly discovered, the terminal management unit 230 calculates a propagation distance to the ONT according to a known communication protocol to determine a line length.

A standard for measuring a propagation distance between an OLT and an ONT is already known. In a method according to the standard, a response time of an ONT is included in calculation. The measured distance may have a deviation depending on the length of the response time of the ONT. That is, a logical line length may have a deviation depending on the characteristics of the ONT.

According to an aspect, the terminal management unit 230 may determine the line length by reflecting, in the measured propagation distance, a distance deviation determined for each ONT. According to an aspect, conceptually, the line length information determined by the terminal management unit 230 may be a logical line length obtained by adding the deviation to the physical propagation distance.

According to an aspect, the deviation added to the propagation distance measured to discover the logical line length information may include a pre-assigned delay and a response time of the ONT. Obviously, the deviation may be defined as a unique attribute value corresponding to the type of the ONT.

According to another aspect, such attribute values may be managed as model information depending on the type of the ONT. For example, the model information of the ONT may be managed in the following table form:

| Model of ONT | Deviation |
|---|---|
| MODEL_A | +10 |
| MODEL_B | −30 |
| MODEL_C | +4 |

The terminal management unit 230 may determine the line length by extracting the distance deviation determined according to the ONT with reference to the model information of the ONT and reflecting the extracted deviation in the measured propagation distance.

The OLT may allocate resources for communication, for example, bandwidth, to OLTs. When a specific ONT does not use an allocated bandwidth, for example, when a specific ONT does not transmit data at an allocated timeslot, it can be seen that the terminal is deactivated or removed. When the specific ONT is deactivated or removed, the terminal management unit 230 may update the terminal information 530 immediately. As another example, when the specific ONT is deactivated or removed, the OLT may update the terminal information 530 after a reference delay duration (aging time). When a specific ONT is deactivated and a corresponding entry is deleted from the terminal information 530, the terminal connection management unit 250 also deletes a corresponding entry from the terminal connection information 550.

When one ONT connected to a specific port of the OLT through an optical splitter is newly discovered, the terminal connection management unit 250 registers the serial number and identification information of the ONT in the corresponding entry of the terminal connection information 550. Also, when one ONT connected to a specific port of the OLT through an optical splitter is removed and the removal is detected, the terminal connection management unit 250 deletes the serial number and identification information of the ONT from the corresponding entry of the terminal connection information 550. In the shown embodiment, when the terminal information 530 is changed, the terminal connection management unit 250 generates an event based on the change, detects a change in state of the ONT, and updates the corresponding entry of the terminal connection information 550.

Generally, the service settings information of an ONT is managed by the ONT. According to an aspect, the OLT separately stores and manages service settings information of an ONT connected to a corresponding line by mapping the service settings information to a line identifier. When a new ONT is activated, the OLT may provide the service settings information mapped to the line identifier to the new ONT. When a specific ONT is moved to and installed on another line (i.e., ONT MOVE), the ONT may select one of the service settings information that was used and the service settings information set for the new line. All the settings information may be managed by the OLT. The selection may be set by a manager. Since the line is associated with a physical location, typically, the operation may be based on a specific location, that is, service settings information for a line, because the line is associated with a physical location. However, for example, due to a port of an OLT, when a passive optical network connected to the port is moved to another port, it is advantageous for the ONTs to maintain their own service setting information in terms of service continuity. Since there is such a case, a method of selecting service settings information may be managed to be changed by a manager.

According to an additional aspect, Rx optical power received by an OLT from an ONT in order to identify the ONT should be further considered. The Tx power of the ONT optical is almost the same for all the devices or all the ports. In addition, when attenuation in an optical fiber line is not large, the Rx optical power has similar values. The network configuration management unit 210 additionally assigns a different line identifier to the line length information depending on Rx optical power received from a corresponding ONT.

Figure 4:
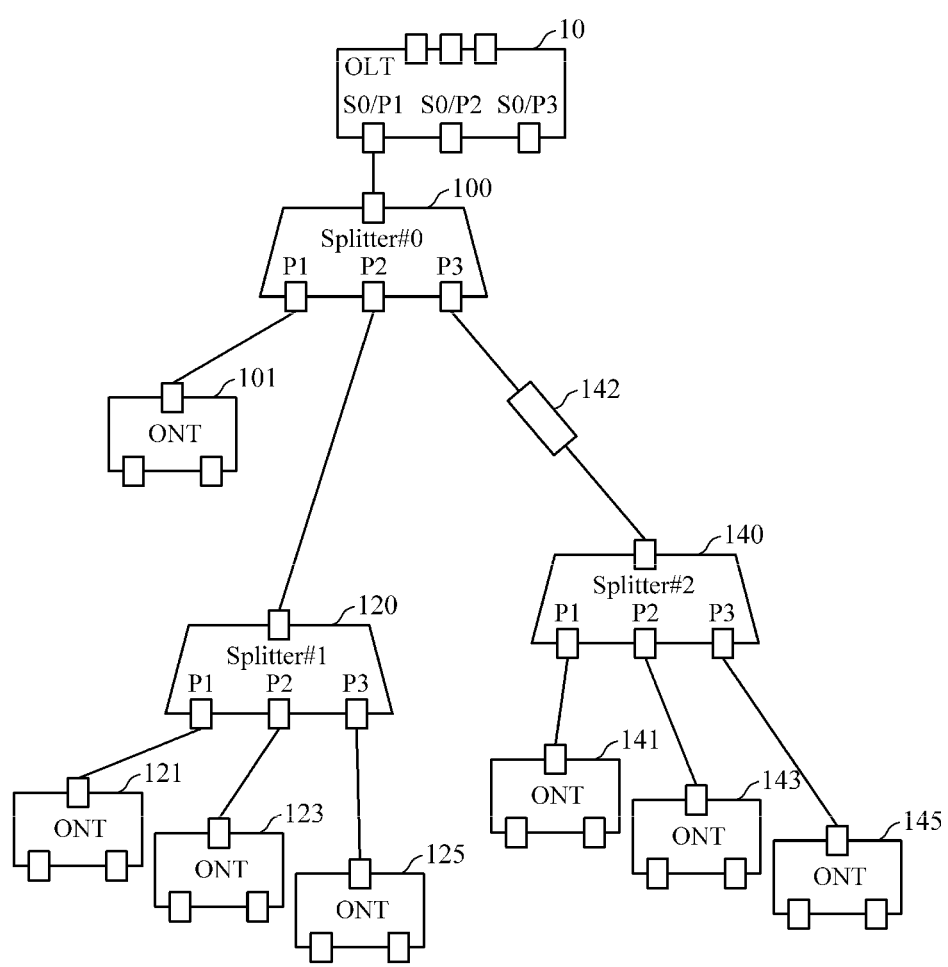
FIG. 4 shows an example passive optical network system to which an optical line terminal is applied according to still another embodiment.

FIG. 4 shows an example passive optical network system to which an OLT is applied according to still another embodiment. Compared to FIG. 2, the optical network system of FIG. 4 additionally includes an attenuator 142. For example, the length of an optical fiber line connected to each port of an OLT and the length of an optical fiber line connected to each port of each optical splitter may be allocated as follows:

|  | Line Length between OLT Port and Optical Splitter #0 | Line Length between Optical Splitters | Line Length between Optical Splitter and ONT | Total Line Length to ONT |
|---|---|---|---|---|
| ONT#2 | 100 | 600 | 100 | 800 |
| ONT#3 | 100 | 600 | 200 | 900 |
| ONT#4 | 100 | 600 | 300 | 1,000 |
| ONT#5 | 100 | 600 | 100 | 800 |
| ONT#6 | 100 | 600 | 200 | 900 |
| ONT#7 | 100 | 600 | 300 | 1,000 |

The ONTs connected to the optical splitter #1 120 and the ONTs connected to the optical splitter #2 140 are not distinguished from each other only using line lengths. Since the optical splitters are passive elements, power received by the OLT 10 from the optical splitter #2 140 thought the optical splitter #0 100 is significantly attenuated relative to power received from the optical splitter #1 120 through the optical splitter #0 100 or power received directly from the ONT 101. By considering Rx optical power received from a corresponding ONT in addition to the line length, the ONT 121 may be distinct from the ONT 141. Likewise, the ONT 123 may be distinct from the ONT 143, and the ONT 125 may be distinct from the ONT 145. In an embodiment, for the network configuration information 510, a line identifier is allocated to a level of Rx optical power in addition to the line length. The network configuration management unit 210 calculates the line length and measures the Rx optical power. Then, the network configuration management unit 210 allocates a line identifier according to the values.

According to the proposed invention, by identifying service information of optical network terminals according to line lengths instead of depending on the apparatuses, it is possible to maintain the same identifier even after apparatus replacement.

Furthermore, according to the proposed invention, it is possible to maintain a service without setting or changing service information during apparatus replacement.

Furthermore, the proposed invention may be easily applied to a location optical network for an enterprise in which lines can be installed depending on designed line lengths.

The present invention has been described above with reference to embodiments referring to the accompanying drawings, but is not limited thereto. Rather, the present invention should be construed as encompassing various modifications that may be apparent to those skilled in the art. The described aspects may be freely combined without contradiction, and such combinations are also included in the scope of the present invention.

The appended claims are intended to cover such combinations and omitted or simplified embodiments, but the present invention does not claim all such combinations, and the combinations should be allowed to fall into the scope of the present invention through future amendments.

What is claimed is:

1. An optical line terminal having ports to which a plurality of optical network terminals are connected through a passive optical network, the optical line terminal comprising:
   a memory configured to store a management program and management data; and
   a computing element configured to execute the management program,
   wherein the management data network configuration information comprises line length information regarding line lengths to the ports and line identifier information regarding line identifiers corresponding to the line lengths and comprises information for mapping line identifiers to an identifier of an optical network terminal connected to a corresponding line,
   wherein the management program comprises a set of terminal connection management instructions for managing terminal connection information such that an identifier of one optical network terminal connected to each port is mapped to a line identifier corresponding to a line length to the optical network terminal.

2. The optical line terminal of claim 1, wherein the management program further comprises a set of network configuration management instructions line length information regarding ends of the ports in the network configuration information, which is mapped to a line identifier.

3. The optical line terminal of claim 2, wherein the set of the network configuration management instructions comprises a set of manual line information registration instructions for receiving the line length information regarding the ends of the ports from a manager, for mapping the line length information to line identifiers, and for storing the line length information in the network configuration information.

4. The optical line terminal of claim 3, wherein the set of the manual line information registration instructions comprises a set of line profile copy instructions for copying network configuration information of a first port to network configuration information of a second port.

5. The optical line terminal of claim 2, wherein the set of the network configuration management instructions comprises a set of automatic line information registration instructions for measuring a propagation distance from each port to a corresponding optical network terminal, for calculating line length information regarding line lengths to line ends to which the optical network terminals are connected, for mapping the line length information to line identifiers corresponding to the line ends, and for storing the line length information in the network configuration information.

6. The optical line terminal of claim 1,
   wherein the management data further includes identification information of the optical network terminals and terminal information including information regarding connected ports and measured line lengths, and
   wherein the management program further comprises a set of terminal management instructions for checking the terminal identification information and the line distance mapped to the terminal identification information when an activation event has occurred in the optical network terminal and for updating the terminal information when there is a change in the terminal identification information or the line length.

7. The optical line terminal of claim 6, wherein the set of the terminal management instructions is for updating the terminal information after a reference delay duration when a specific optical network terminal is deactivated.

8. The optical line terminal of claim 6, wherein the set of the terminal management instructions determines the line lengths by reflecting, in the measured propagation distance, a distance deviation determined according to a corresponding optical network terminal.

9. The optical line terminal of claim 1, wherein the network configuration information further comprises line-identifier-specific location information.

10. The optical line terminal of claim 2, wherein the set of the network configuration management instructions is for additionally assigning a different line identifier to the line length information depending on Rx optical power received from a corresponding optical network terminal.

11. A method of managing a passive optical network by using an optical line terminal having ports to which a plurality of optical network terminals are connected through a passive optical network, the method comprising a terminal connection management operation of mapping an identifier of one optical network terminal connected to each of the ports to a line identifier corresponding to a line length to the optical network terminal and of registering the identifier of the optical network terminal mapped to the line identifier in terminal connection information stored in a memory.

12. The method of claim 11, further comprising a network configuration management operation of mapping line length information regarding line lengths to ends of the ports to a line identifier and of registering the line length information network configuration information stored in the memory.

13. The method of claim 12, wherein the network configuration management operation comprises a manual line information registration operation of receiving the line length information regarding the line lengths to the ends of the ports from a manager, of mapping the line length information to a line identifier, and storing the line length information in the map configuration information.

14. The method of claim 13, wherein the manual line information registration operation comprises a line profile copy operation of copying network configuration information of a first port to network configuration information of a second port.

15. The method of claim 12, wherein the network configuration management operation comprises an automatic line information registration operation of measuring a propagation distance from each of the ports to a corresponding optical network terminal, of calculating line length information regarding line lengths to line ends to which the optical network terminals are connected, of mapping the line length information to line identifiers corresponding to the line ends, and of storing the line length information in the network configuration information.

16. The method of claim 11, further comprising a terminal management operation of checking the terminal identification information and the line distance mapped to the terminal identification information when an activation event has occurred in the optical network terminal and of updating the terminal information stored in the memory when there is a change in the terminal identification information or the line length mapped to the terminal identification information.

17. The method of claim 16, wherein the terminal management operation comprises updating the terminal information after a reference delay duration when a specific optical network terminal is deactivated.

18. The method of claim 16, wherein the terminal management operation comprises determining the line lengths by reflecting, in the measured propagation distance, a distance deviation determined according to a corresponding optical network terminal.

19. The method of claim 11, wherein the network configuration information further comprises line-identifier-specific location information.

20. The method of claim 12, wherein the network configuration management operation comprises additionally assigning a different line identifier to the line length information depending on Rx optical power received from a corresponding optical network terminal.

* * * * *